United States Patent
Eifert et al.

(10) Patent No.: US 11,710,832 B2
(45) Date of Patent: Jul. 25, 2023

(54) ELECTRODE MATERIAL AND ELECTRODE FOR OPERATING-MEDIUM DISTRIBUTION IN A FUEL CELL

(71) Applicant: Robert Bosch GmbH, Stuttgart (DE)

(72) Inventors: Alexander Eifert, Friolzheim (DE); Claudio Baldizzone, Stuttgart (DE); Harald Bauer, Ehningen (DE); Juergen Hackenberg, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/291,686

(22) PCT Filed: Nov. 6, 2019

(86) PCT No.: PCT/EP2019/080358
§ 371 (c)(1),
(2) Date: May 6, 2021

(87) PCT Pub. No.: WO2020/094697
PCT Pub. Date: May 14, 2020

(65) Prior Publication Data
US 2022/0006098 A1    Jan. 6, 2022

(30) Foreign Application Priority Data
Nov. 8, 2018 (DE) .................. 10 2018 219 065.8

(51) Int. Cl.
*H01M 4/86* (2006.01)
*H01M 4/88* (2006.01)

(52) U.S. Cl.
CPC ....... *H01M 4/8626* (2013.01); *H01M 4/8875* (2013.01); *H01M 4/8896* (2013.01)

(58) Field of Classification Search
CPC . H01M 4/8626; H01M 4/8875; H01M 4/8896
See application file for complete search history.

(56) References Cited

U.S. PATENT DOCUMENTS

| 6,566,004 B1* | 5/2003 | Fly ...................... H01M 8/0247 429/514 |
| 2002/0114990 A1* | 8/2002 | Fly ...................... H01M 8/2418 429/514 |

(Continued)

FOREIGN PATENT DOCUMENTS

| EP | 3396754 A1 | 10/2018 |
| JP | 2010077491 A * | 4/2010 |

(Continued)

OTHER PUBLICATIONS

Machine translation of Daigo et al. (JP 2010077491 A1) (Year: 2010).*

(Continued)

*Primary Examiner* — Brian R Ohara
*Assistant Examiner* — Aaron J Salter
(74) *Attorney, Agent, or Firm* — Michael Best & Friedrich LLP

(57) ABSTRACT

An electrode material (1) for a fuel cell (50), comprising a planar body (11) made of an electrically conductive foam having an open and continuous porosity for at least one operating medium of the fuel cell (50), wherein the planar body (11) has a top side (12) and a bottom side (13), and wherein the thickness (14) of the material across all points (12a, 12a') on the surface of the top side (12), measured in each case between a point (12a, 12a') on the surface of the top side (12) and the point (13a, 13a') opposite this point (12a, 12a') on the surface of the bottom side (13), varies by at least 10%. An electrode (2) for a fuel cell (50), comprising a planar body (21) made of an electrically conductive foam having an open and continuous porosity for at least one operating medium of the fuel cell (50), wherein the planar body (21) has a top side (22) and a bottom side (23), and wherein the top side (22), and/or the bottom side (23), has regions (22a, 23a) in which the porosity of the planar body (Continued)

(11) is reduced by at least 10%. A fuel cell (50) comprising the electrode (2). A method for production.

16 Claims, 5 Drawing Sheets

(56) References Cited

U.S. PATENT DOCUMENTS

| | | | | |
|---|---|---|---|---|
| 2009/0169962 A1* | 7/2009 | Hsing | ................ | H01M 4/8605 |
| | | | | 429/415 |
| 2010/0062317 A1* | 3/2010 | Selcuk | .............. | H01M 8/04089 |
| | | | | 422/186.04 |
| 2012/0021329 A1 | 1/2012 | Yamauchi et al. | | |
| 2015/0380694 A1* | 12/2015 | Kadono | ................ | F16J 15/062 |
| | | | | 277/644 |

FOREIGN PATENT DOCUMENTS

| | | |
|---|---|---|
| WO | 2018042975 A1 | 3/2018 |
| WO | 2018114948 A1 | 6/2018 |

OTHER PUBLICATIONS

Translation of the International Search Report for Application No. PCT/EP2019/080358 dated Mar. 9, 2020 (2 pages).

* cited by examiner

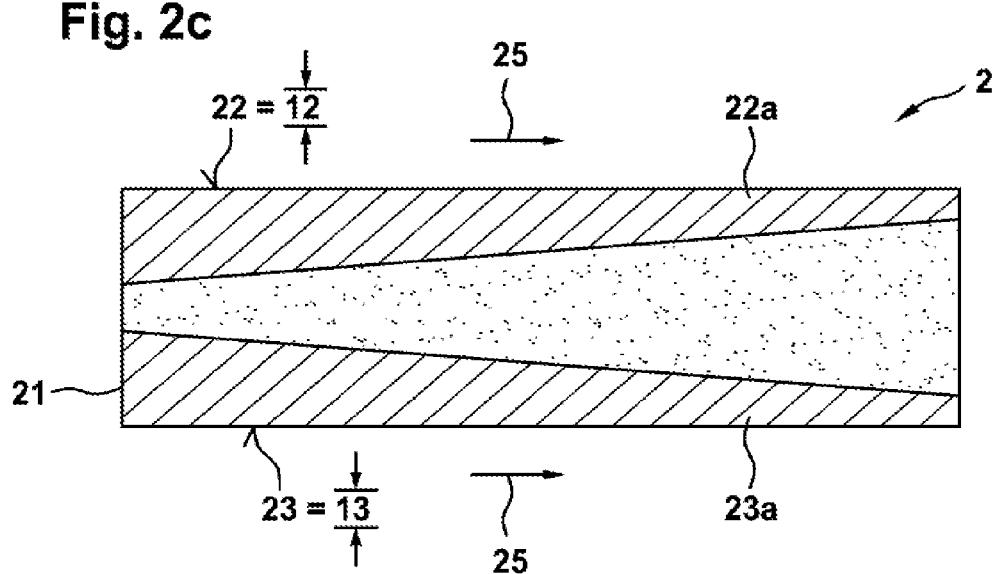
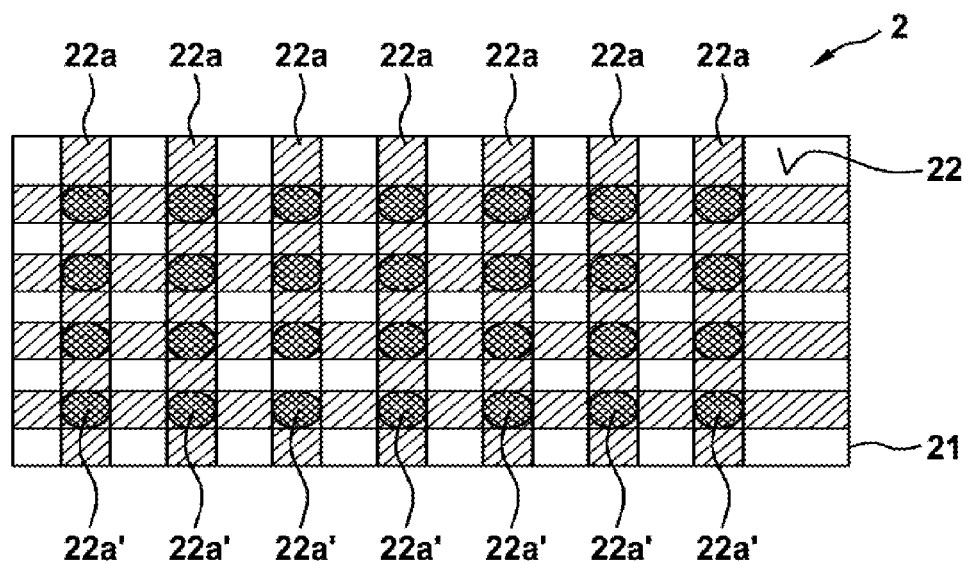

ELECTRODE MATERIAL AND ELECTRODE FOR OPERATING-MEDIUM DISTRIBUTION IN A FUEL CELL

BACKGROUND OF THE INVENTION

The present invention relates to an electrode which serves for distributing at least one operating medium of a fuel cell, and also to an electrode material, to a method for producing the electrode and to a fuel cell with the electrode.

In a fuel cell, fuel provided in an anode space reacts with an oxidizing agent present in a cathode space through the intermediary of an electrolyte. In this case, the electrolyte is only conductive to ions, and free electrons are produced which can drive a current through an external load.

In order to achieve an optimum energy density of the current generation, it is important that the fuel and the oxidizing agent are each uniformly distributed over the entire surface area of the electrolyte. For the coarse distribution, distributing structures are incorporated in bipolar plates or end plates that delimit the anode space and the cathode space on the side respectively facing away from the electrolyte. These distributing structures are adjoined by porous gas diffusion layers as electrode structures. DE 10 2016 213 057 A1 discloses an example of a fuel cell in which the bipolar plate comprises complex distributing structures.

SUMMARY OF THE INVENTION

Within the scope of the invention, an electrode material for a fuel cell has been developed. This electrode material comprises a plate-like body composed of an electrically conductive foam with an open and continuous porosity for at least one operating medium of the fuel cell. The plate-like body has an upper side and an underside. The thickness of the material, measured in each case between a point on the surface of the upper side and the point, situated opposite said point, on the surface of the underside, varies across all of the points on the surface of the upper side by at least 10%.

It has been recognized that large distributing structures for operating media can be introduced into the electrode material by a modulation of the porosity of a foam. This means that the finished electrode is composed of the electrically conductive foam throughout, while the porosity of this foam differs locally. In particular, the regions with the reduced porosity can interact with the end plate or bipolar plate in order to form a distributing structure for the operating medium. In this case, the functionality of the distributing structure may be distributed in any way desired over the regions with the reduced porosity on the one hand and the end plate or bipolar plate on the other hand. Thus, for example, the function of distributing structures integrated in the end plate or bipolar plate can be enhanced by the regions with the reduced porosity. The regions with the reduced porosity may however also interact for example with a planar surface of the end plate or bipolar plate.

The formation of distributing structures involving the regions with reduced porosity has in any case the advantage of making the distribution more uniform. In particular, all of the regions of the distributing structures can be reached well by the operating medium. The distribution by the open-cell foam is possible with little pressure loss, and the porosity also allows a transverse exchange of locally differing pressure losses. In particular, the extent in the plane through the foam structure in the direction of flow can assume a ratio in relation to the circumference of the cross section through which flow passes of between for example 0.2 to 1 and 5 to 1.

Until now, it would have been relatively laborious to produce in particular a metallic foam with locally variable porosity at specific locations. The normal foaming process, which produces macroscopic blocks with dimensions of several decimeters at once, leads to a stochastically regular structure. Additive manufacturing processes, such as for instance 3D printing, require more time in comparison with this.

It has thus been recognized that the electrode material with the variable thickness can be used to produce an electrode with locally variable porosity particularly easily. If, for example, an electrode material with local elevations is pressed or rolled to a desired thickness, then the material contained in the elevations must go somewhere. It can only escape into the interior of the foam by virtue of the foam being locally subjected to greater compression there. This local compression at the same time locally reduces the porosity.

In this case, the thickness of the material varies across all points on the surface of the upper side by at most 50%. It is then still ensured that the electrode produced from the electrode material is at least to some extent still permeable to the operating medium also in the regions with reduced porosity.

For this reason, it is also advantageously the case that the porosity of the foam in the not yet pressure-treated state is between 40% and 80%.

For example, the upper side of a slice cut from a foam block may taper in the form of a wedge toward the underside, and/or the underside may taper in the form of a wedge toward the upper side. During the pressing or rolling of the electrode material to form an electrode, an electrode with a steady gradient of the porosity is then produced.

In a particularly advantageous refinement, the upper side, and/or the underside, has elongate elevations and/or depressions, which define channel-like structures on the upper side, or on the underside. If an electrode material structured in such a way is rolled or pressed to form an electrode, the operating medium then preferably moves within these channel-like structures within the finished electrode. At the interface in relation to regions with the reduced porosity, the flow "accumulates". As a result, the flow can be directed in the plane of the plate-like electrode, but also perpendicularly to this plane.

At the same time, however, the regions with the reduced porosity, as are produced when elevations are compressed, are not completely impermeable to the operating medium, but still contribute as before to its distribution. Therefore, for example, the uniform supply of an electrolyte alongside an electrode produced in this way is ensured. On the other hand, gas distributing structures in end plates or bipolar plates are of course situated in a gas-impermeable material, which allows a flow of the operating medium only within the distributing structures and otherwise prevents it completely. Therefore, a gas diffusion layer is generally required between such a gas distributing structure and the electrolyte.

Since the described electrode material now allows both the functionality of a macroscopic distributing structure and the functionality of a microscopic gas diffusion layer to be combined in one and the same electrode, a fuel cell with such an electrode can be produced so as to be thinner. As a result, the power density of the fuel cell is increased. This in turn is relevant in particular whenever a multiplicity of fuel cells are connected together to form a stack for the purposes of generating a higher voltage or a higher current.

As explained above, the advantages of a variable porosity in the electrode can be brought about in particular by the described electrode material, which brings about this variable porosity after the compression to form a finished electrode. Physically, the advantageous effects of the variable porosity are however only associated with the porosity being variable in the first place, in whatever way this may have been brought about. Thus, for example, a breakthrough in the speed of 3D printing may have the effect that the general teaching provided here of locally varying the porosity of an electrode for a fuel cell will become just as cost-effectively implementable by additive manufacturing as it can at present by the pressing or rolling of foams.

Therefore, the invention relates generally to an electrode for a fuel cell. This electrode comprises a plate-like body composed of an electrically conductive foam with an open and continuous porosity for at least one operating medium of the fuel cell. The plate-like body has an upper side and an underside. The upper side, and/or the underside, has regions in which the porosity of the plate-like body is reduced by at least 10%.

According to the above description, the porosity is advantageously reduced by deformation. This can actually be seen from the finished electrode, since deformation has the effect for example that webs with a generally continuous curve profile that form the bubbles of the porosity are significantly stretched, compressed, bent or even broken with respect to their usual length that can be seen from the rest of the material.

The porosity is advantageously reduced by at most 50% in the regions with the reduced porosity. As explained above, all of the regions of the electrode are then still sufficiently permeable to the operating medium.

The regions with the reduced porosity advantageously define channel-like structures in the upper side, or in the underside. In this way, it can be achieved in particular that an operating medium supplied only at one defined location is distributed over the entire surface area of the electrolyte, and consequently the power output of the fuel cell is also made more uniform spatially.

In a further advantageous refinement, the channel-like structures transition into material recesses in the surface of the upper side, and/or in the surface of the underside. Ideally, the material recesses run here substantially parallel to the channel-like structures. The material recesses form regions in which an operating medium for the fuel cell undergoes only a negligible pressure loss, unlike when the electrically conductive foam is penetrated. If the electrode is then used in a fuel cell, it is thus possible for energy for the compression of the operating medium to be saved and thus for the overall efficiency of the fuel cell to be increased.

In this case, the material recesses are advantageously arranged in that side of the electrode which faces away from the side which comprises the regions with reduced porosity. Thus, if the regions with reduced porosity are situated in the upper side of the electrode, the material recesses are situated in the underside of the electrode, and vice versa. The electrode may then, for example, be arranged in the fuel cell in such a way that the side that comprises the regions with reduced porosity faces toward the electrolyte, while the side with the material recesses faces toward a bipolar plate or end plate. An operating medium supplied in the region of the bipolar plate or end plate can then initially distribute itself freely along the material recesses. On its way to the electrolyte, it then experiences a progressively increasing flow resistance, while however at the same time the entire surface area of the electrolyte can still be reached by the operating medium.

The material recesses advantageously reach to a maximum depth that is between 10% and 40% of the maximum material thickness of the electrode. This represents an optimum compromise between a largest possible flow cross section for the operating medium on the one hand and a highest possible remaining stability of the electrode material on the other hand.

In a further advantageous refinement, the porosity increases or decreases monotonously along at least one direction along the surface of the upper side, or along the surface of the underside. This progression of the porosity can also be used to make the ultimate transformation of the operating medium on the electrolyte more uniform. If, for example, the operating medium is supplied at a left edge of the plate-like electrode through a supply line, the porosity may be comparatively low there in order that the greater part of the operating medium progresses to the right and later also reaches the electrolyte there. At its right edge, where the operating medium arrives with reduced pressure, the electrode may on the other hand be comparatively permeable in the direction of the electrolyte.

According to the description above, the electrode is advantageously produced by pressing and/or rolling the described electrode material. It can be actually seen from the finished electrode whether it has been produced in this way.

The pressing may be advantageously carried out, for example, by pressing between a first, planar pressing surface and a second, topographically structured pressing surface. The rolling may be carried out, for example, between a first, purely cylindrical roller and a second roller that is likewise cylindrical but topographically structured on its cylinder shell. In this case, the topographical structuring of the second pressing surface, or of the second roller, corresponds to the material recesses. Here, "corresponds" should be understood as meaning in particular that the topographical structuring predetermines the places at which the material recesses are located, without the profile of the material recesses that is ultimately adopted corresponding completely to the profile of the topographical structuring. Since the electrically conductive foam of the electrode material has a certain elasticity, the electrode material can partially spring back after the pressing-in of the topographical structuring, so that the material recess is for example less deep in the final state than at the moment of pressing-in.

The material recesses may also be produced in any other way desired, such as for example by removal with a laser beam. However, pressing and rolling with topographical structuring are advantageous to the extent that the modification required with respect to the previous pressing or rolling can be implemented particularly easily and inexpensively. On the other hand, removal with a laser beam has the advantage that the remaining material is not compressed.

At least in partial regions, the average pore size of the electrode material, or of the finished electrode, is advantageously between 100 µm and 400 µm. The lower limit has the effect that the pressure loss of the operating medium does not become too great. The upper limit has the effect that the distribution of the operating medium over the surface of the electrolyte is still sufficiently fine.

According to the description above, the invention also relates to a fuel cell with an anode space, a cathode space and an electrolyte, which separates the anode space from the cathode space. The anode space and the cathode space are respectively delimited on the side facing away from the electrolyte by an end plate or bipolar plate. The above-described electrode is arranged between at least one end plate or bipolar plate, on one side, and the electrolyte, on the other side, such that the end plate or bipolar plate interacts with those regions of the electrode in which the porosity is reduced in order to form a distributing structure for at least one operating medium of the fuel cell. As explained above, this has the effect inter alia that the fuel cell can be of thinner construction overall.

According to the description above, the end plate or bipolar plate may additionally interact with material recesses of the electrode in order to form the distributing structure, so as to reduce pressure losses of the operating medium. The pressure loss is determined fundamentally by the flow cross section provided for the operating medium in conjunction with the wall spacings of the structures that have to be traversed by the operating medium. In the case of typical dimensions of the material recesses, said pressure loss can be reduced to approximately half in relation to a state in which the operating medium must constantly traverse the electrically conductive foam.

The invention also relates to a method for producing the described electrode material. In said method, the plate-like body is cut off from a block of the electrically conductive foam. A cutting tool in wire form is moved in a uniform basic movement through the block. The variation of the thickness is introduced by virtue of a movement of the cutting tool perpendicular to said basic movement being modulated onto the basic movement.

A cutting tool in wire form is to be understood in this context to mean in particular a cutting tool which has at least one linear cutting-edge, wherein, at a given position along the basic movement through the block, a movement of the cutting tool perpendicular to the direction of said basic movement leaves that part of the material which is situated behind along the basic movement, that is to say which has already been cut, unchanged, and is also not impeded by said part. For example, a thin wire always interacts with the block only at the present position of said wire along the basic movement, and cuts progressively along a line that is defined by the superposition of basic movement and modulated movement. By contrast, an elongate saw blade, once situated fully in a gap that it has cut in the interior of the block, for example abuts with an edge situated opposite the cutting edge against the side walls of the gap. The saw blade thus cannot be arbitrarily tilted in order to change the direction in which the cut is continued through the block. Cutting using a cutting tool in wire form, also with the aid of electrical currents, is known per se under the expression "wire erosion".

It has been identified that, in this way, the electrode material can be produced quickly and inexpensively in macroscopic orders of magnitude and with a large range of structurings of the local thickness. In particular, structurings that extend laterally across the entirety of the finished electrode and which can be used as channel-like structures for conducting operating media can be easily produced for example by means of a wire that extends through the entire block.

The blocks in which the electrically conductive foam is present typically have an order of magnitude of 20 cm×30 cm×1 m. A plate-like body of the electrode material may for example have a thickness between 0.5 mm and 3 mm. It is thus possible for several plate-like bodies to be cut from one block. It is then advantageous to minimize cutting waste so as not to unduly waste material. For this purpose, it is advantageously the case that complete cuts through the block with a modulated basic movement, that is to say with a cut surface which runs not only in the direction of the basic movement, and complete cuts through the block with an unmodulated basic movement, that is to say with a cut surface which runs in planar form in the direction of the basic movement, are performed in alternation. The planar cut surface can then serve for example as a support surface for the electrode material, if this is processed into a finished electrode for example by pressing or rolling. The non-planar cut surface provides the structures that are for example pressed into the material during the pressing or rolling. Every piece cut off from the block can then be used as a plate-like body of the electrode material. Only the abraded material formed at the respective cutting-edge is produced as waste.

The invention also relates to a further method for producing the described electrode from the described electrode material. In the case of said method, the electrode material is at least temporarily compressed in terms of its thickness by at least 20% and at most 60%.

It has been identified that, specifically in the case of a compression in this range, the porosity within the electrode is varied to a degree such that, as a result, a flow of an operating medium can be conducted within the electrode, whereas at the same time an open porosity still remains throughout the entire electrode, and no region is entirely excluded from the supply of the operating medium. The electrode can then particularly effectively, as described above, perform a dual function as a distributing structure and diffusion layer for the operating medium.

It is taken into consideration here that the electrode material partially springs back after the withdrawal of the compressing force. The deformation is thus partially plastic and partially elastic.

It is advantageously the case that the electrode material is, for the compression, loaded with a pressure between 200 N/cm$^2$ and 3000 N/cm$^2$. These loads lie considerably above the typical pressure of 150 N/cm$^2$ to which the finished electrode is exposed in the presence of the normal pressing action in a fuel cell, or a fuel cell stack. Pressures specifically in this range lead to an at least partially plastic deformation of the electrode material, without too many pores being completely closed or destroyed in the process.

Further measures that improve the invention will be presented in more detail below with the description of the preferred exemplary embodiments of the invention on the basis of figures.

BRIEF DESCRIPTION OF THE DRAWINGS

In the figures:

FIGS. 2a, 2b and 2c show exemplary embodiments of the electrode 2, obtainable by pressing or rolling of the electrode materials 1 shown in FIG. 1;

FIG. 3 shows an exemplary embodiment of the electrode 2 with two different gradations of a reduced porosity;

DETAILED DESCRIPTION

Figure 1A:
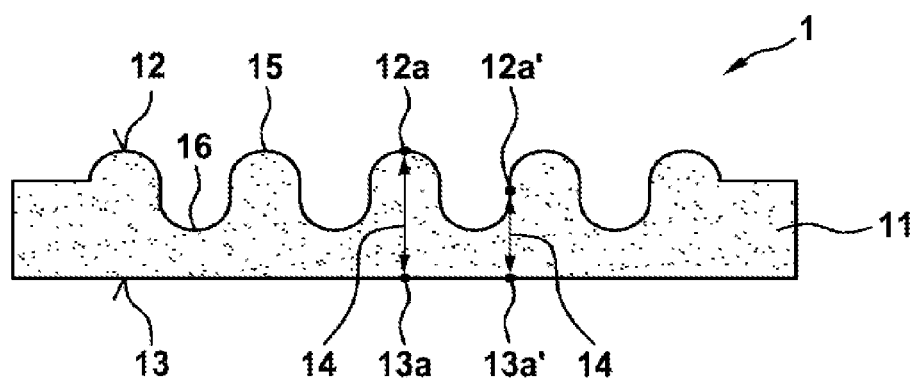
FIGS. 1a and 1b show exemplary embodiments of the electrode material 1.

FIG. 1a shows a first exemplary embodiment of the electrode material 1 in a schematic sectional drawing. The plate-like body 11 of the electrode material 1 has an upper side 12 and an underside 13. The underside 13 is planar, and the upper side 12 has an undulating structure. The thickness 14 of the material, measured in each case between a point 12a or 12a' on the upper side 12 and a point 13a or 13a', situated opposite said point 12a or 12a', on the underside 13 is variable owing to said structuring. There are thus elevations 15, and in this example also depressions 16, in the upper side 12 of the electrode material 1.

Figure 1B:
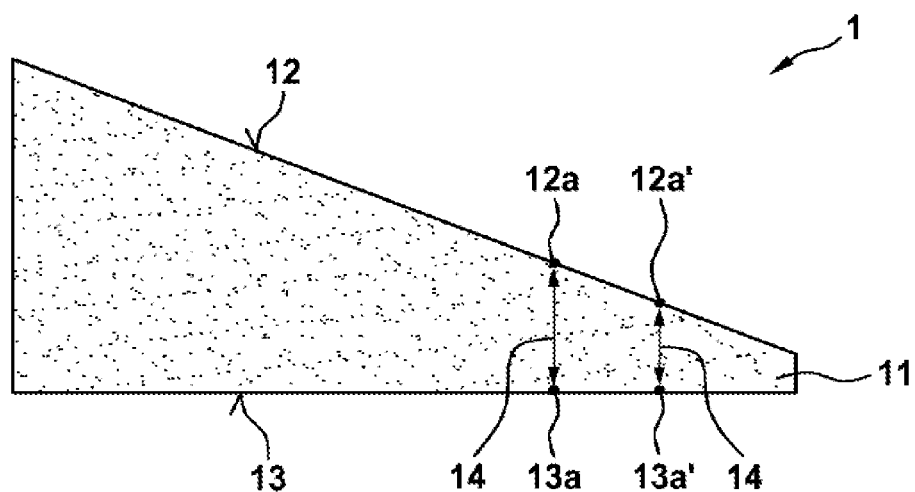

FIG. 1b shows a second exemplary embodiment of the electrode material 1 in a schematic sectional drawing. Here, the underside 13 of the plate-like body 11 is in turn planar, whereas the upper side 12 tapers in the form of a wedge toward the underside 13. The thickness 14 of the plate-like body 11 thus decreases continuously from left to right.

Figure 2A:
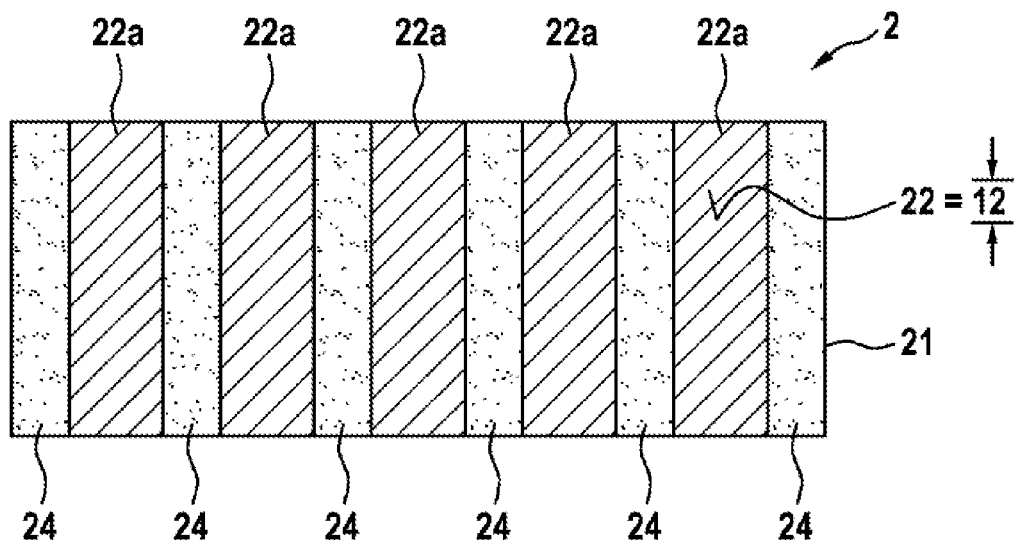
Figure 2B:
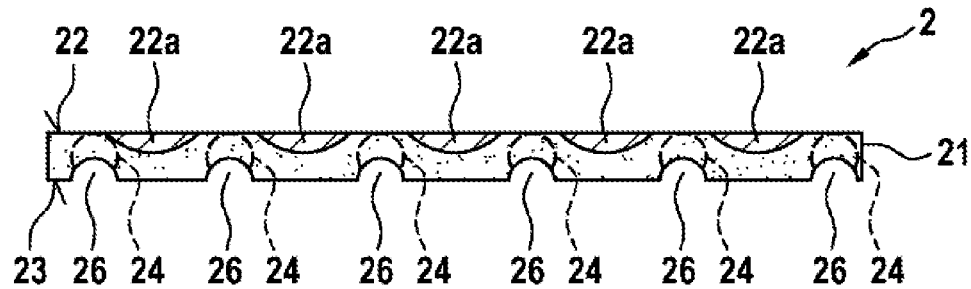

FIGS. 2a and 2b show a first exemplary embodiment of the electrode 2, obtainable for example by pressing or rolling of the electrode material 1 shown in FIG. 1a. FIG. 2a shows a schematic plan view, and FIG. 2b shows a schematic sectional drawing.

The electrode 2 has a plate-like body 21, which has originated, for example by at least partial plastic deformation, from the plate-like body 11 of the electrode material 1. The plate-like body 21 has an upper side 22 and an underside 23 (not visible in FIG. 2a). The elevations 15 (visible in FIG. 1a) in the electrode material 1, after the pressing, become regions 22a with reduced porosity in the upper side 22, because the material contained in the elevations 15 must escape inward into the body 21. Said regions 22a pose an increased flow resistance to a through-flowing operating medium for a fuel cell 50. The intermediate spaces between said regions 22a define channel-like structures 24 in the upper side 22. During the operation of the fuel cell 50, the plate-like body 21 of the electrode 2 can accommodate more operating medium, and transport said operating medium more quickly, in said regions 24 than in the regions 22a. Also shown in FIG. 2b are material recesses 26 into which the channel-like structures 24 transition. Here, the material recesses 26 are situated in the underside 23 of the electrode, that is to say in that side of the electrode 2 which faces away from the regions 22a with reduced porosity.

FIG. 2c shows a second exemplary embodiment of the electrode 2, obtainable for example by pressing or rolling of the electrode material 1 shown in FIG. 1b. Here, the acting force is distributed more uniformly over the upper side 12 and the underside 13 of the plate-like body 11 of the electrode material 1. The plate-like body 21 of the electrode 2 that is thus obtained therefore has, both on its upper side 22 and on its underside 23, a respective region 22a and 23a with reduced porosity. The depth to which said region respectively extends into the interior of the plate-like body 21 is determined by how much material must escape into said interior. For example, in the case of the pressing or rolling of the wedge-like body 11 of the electrode material 1 as shown in FIG. 1b, there is the tendency, visible in FIG. 2c, that the regions 22a and 23a at the left edge of the body 21 of the electrode 2 that is formed project deeper into said body than at the right edge. Furthermore, within the regions 22a and 23a, the exact magnitude of the porosity increases monotonously along the direction 25 from left to right.

FIG. 3 shows a third exemplary embodiment of the electrode 2 in a schematic sectional drawing. Said electrode 2 can be obtained for example by virtue of two bodies 11 of electrode materials 1 of the type shown in FIG. 1a being laid with the elevations 15 in the upper sides 12 thereof one on top of the other, specifically so as to be rotationally offset with respect to one another by 90°, and by virtue of said arrangement subsequently being rolled or compressed. All elevations 15 are then, analogously to the transition from FIG. 1a to FIGS. 2a and 2b, converted in each case into regions 22a with reduced porosity, with the difference that there are horizontal and vertical regions 22a of said type. The qualitatively most important difference is however that the intersection points of the elevations 15 are converted into regions 22a' with even more greatly reduced porosity.

If the electrode 2 that is to be produced is, as shown in FIG. 3, rectangular and not square, then it is for example possible for two bodies 11 with the same rectangular dimensions but orientations of the elevations 15 offset with respect to one another by 90° to be produced by virtue of a block being cut from the electrically conductive foam alternately in each case in different directions. If the cuts are alternately made with a 90° offset with respect to one another with uniform and regular modulation, slices are produced, the upper side and underside of which have elevations 15 which are offset with respect to one another by 90°. In turn, a body which is structured on two sides is produced, as shown in FIG. 3.

Suitable variations, for example for rhomboidal flow fields, in which there are thus rhomboidally arranged zones of greater and lesser porosity, can be generated by virtue of the modulated cuts for generating the upper side and underside of the foam slices being performed at an angle between 0° and 90° with respect to one another.

The regions 22a' with the even more greatly reduced porosity can, in a fuel cell 50, be used for example to realize regular points for the homogenization of the local reaction rates, at which water condenses, heat is conducted, or mechanical supporting points are formed, in targeted fashion.

Figure 4:
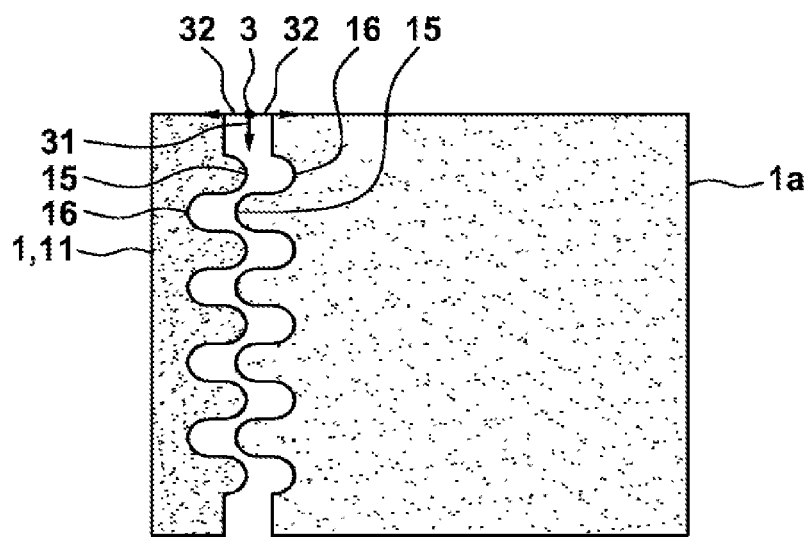
FIG. 4 shows the exemplary production of a body 11 of the electrode material 1 from a block 1a of the electrically conductive foam.

FIG. 4 shows, by way of example, how bodies 11 of electrode materials 1 can be produced from a block 1a of an electrically conductive foam. A cutting tool 3 in wire form which extends perpendicular to the plane of the drawing is led through the block 1a in a basic movement 31 from top to bottom. Said basic movement 31 has a movement 32 perpendicular to it modulated thereon. By means of said further movement 32, it is for example possible for the elevations 15 and depressions 16 visible in FIG. 1a, or for example the wedge shape visible in FIG. 2b, to be introduced into the body 11. In the example shown in FIG. 4, the elevations 15 of the cut-off body 11 correspond to depressions 16 in the surface of the rest of the block 1a, and the depressions 16 of the cut-off body 11 correspond to elevations 15 in the surface of the rest of the block 1a. The preliminary work for the manufacture of the next body 11 has thus already been performed, which next body can be directly cut from the block 1a in the next working step.

Figure 5A:
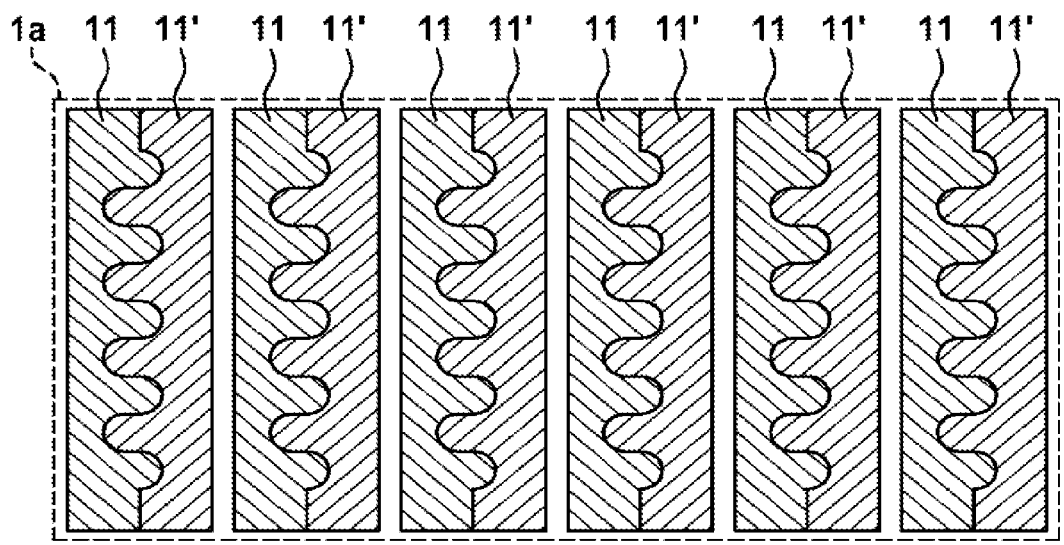
FIGS. 5a and 5b show the exemplary production of a multiplicity of bodies 11, 11' with minimal material loss.
Figure 5B:
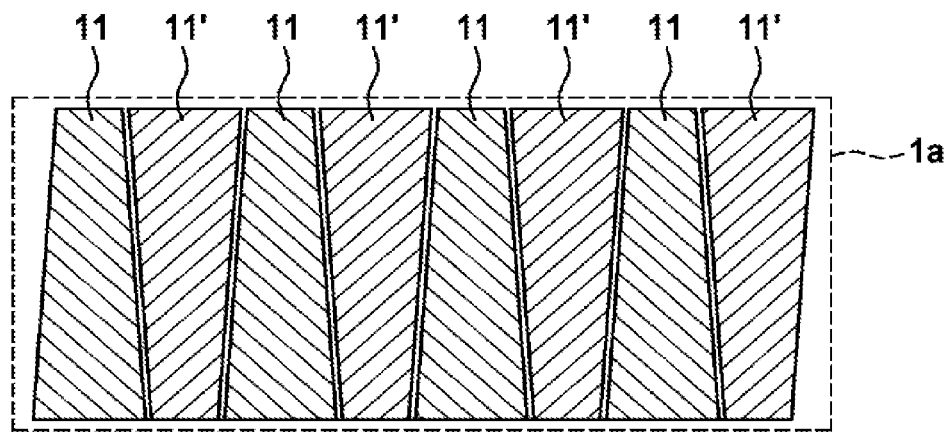

FIG. 5 shows, by way of example, how a multiplicity of bodies 11, 11' of electrode materials 1 can be produced, with minimal loss of material, from a block 1a of an electrically conductive foam. FIG. 5a shows how the block 1a can be divided into a multiplicity of similar bodies 11, 11' of the type shown in FIG. 1a by means of alternate undulating and straight cuts. FIG. 5b shows how the block 1a can, by means of an alternating sequence of two different oblique cuts, be divided into a multiplicity of similar bodies 11, 11', the upper sides and undersides of which respectively taper toward one another.

Figure 6:
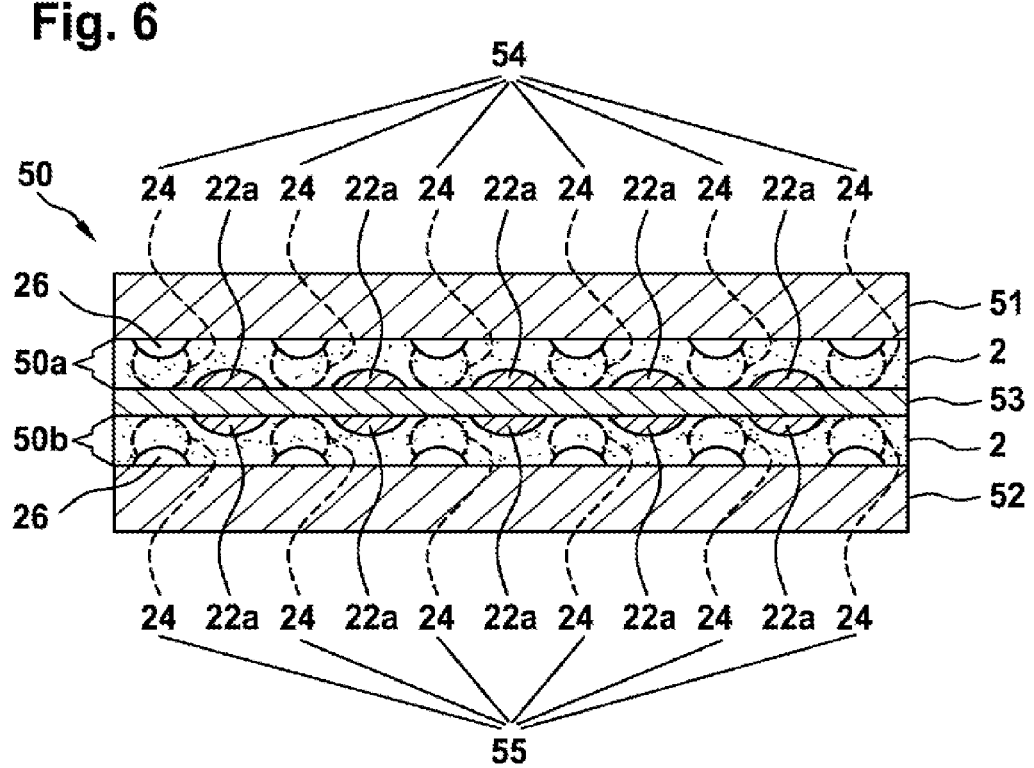
FIG. 6 shows an exemplary embodiment of a fuel cell 50 with exemplary electrodes 2.

FIG. 6 shows an exemplary embodiment of a fuel cell 50. The fuel cell 50 has an anode space 50a and a cathode space 50b, which are separated from one another by an electrolyte 53. The anode space 50a is delimited by a first end plate 51, on one side, and the electrolyte 53, on the other side. The cathode space 50b is delimited by a second end plate 52, on one side, and the electrolyte 53, on the other side. Lateral or encircling seals are not shown in FIG. 6 for the sake of clarity.

In each case one example of the described electrode 2, in this case of the type illustrated in FIG. 2b, is arranged in the anode space 50a and in the cathode space 50b. The respective channel-like structures 24 outside the regions 22a in which the porosity is reduced interact with the respective end plate 51 or 52 in order to form distributing structures 54 or 55 for the operating media of the fuel cell 50.

Analogously to FIG. 2c, it is the case here that the channel-like structures 24 transition into material recesses 26 of the electrodes 2. Here, said material recesses 26 each face toward an end plate 51, 52 and extend parallel to the channel-like structures 24 perpendicular to the plane of the drawing. An operating medium supplied in the region of the end plate 51, 52 can thus firstly be distributed with a low pressure loss over the entire boundary surface between the end plate 51, 52 and the adjoining electrode 2. If the operating medium now moves within the plane of the drawing in the direction of the electrolyte 53, then it is subjected to a progressively increasing flow resistance proceeding from the material recesses.

The invention claimed is:

1. An electrode (2) for a fuel cell (50), the electrode comprising a plate-like body (21) composed of an electrically conductive foam with an open and continuous porosity for at least one operating medium of the fuel cell (50), wherein the plate-like body (21) has an upper side (22) and an underside (23) and wherein at least one of the upper side (22) and the underside (23) is generally planar and has spaced-apart regions (22a) in which the porosity of the plate-like body (11) is reduced by at least 10% relative to other regions of the at least one of the upper side (22) and the underside (23), the other regions being intermediate spaces located between and alternating with the spaced-apart regions (22a), wherein the other regions define channel-like structures (24) between the spaced-apart regions (22a), wherein the channel-like structures (24) have a higher porosity than the spaced-apart regions (22a), whereby the plate-like body (21) of the electrode (2) can accommodate more operating medium, and transport the operating medium more quickly, in the channel-like structures (24) than in the spaced-apart regions (22a), and wherein the channel-like structures (24) transition into material recesses (26) in the other of the upper side (22) and the underside (23), the material recesses being located entirely between the spaced-apart regions (22a).

2. The electrode (2) as claimed in claim 1, wherein the porosity is reduced by deformation in the regions (22a, 23a) with reduced porosity.

3. The electrode (2) as claimed in claim 1, wherein the porosity is reduced by at most 50% in the regions (22a, 23a) with the reduced porosity.

4. The electrode (2) as claimed in claim 1, wherein the material recesses (26) reach to a maximum depth that is between 10% and 40% of the maximum material thickness of the electrode (2).

5. The electrode (2) as claimed in claim 1, wherein porosity increases or decreases monotonously along at least one direction (25) along the surface of the upper side (22) or along the surface of the underside (23).

6. The electrode (2) as claimed in claim 1, the electrode comprising a pressed or rolled electrode material (1), wherein the thickness (14) of the material, measured between a point (12a, 12a') on the surface of the upper side (12) and the point (13a, 13a'), situated opposite said first-mentioned point (12a, 12a'), on the surface of the underside (13), varies across all of the points (12a, 12a') on the surface of the upper side (12) by at least 10%.

7. The electrode (2) as claimed in claim 6, produced by pressing of the electrode material (1) between a first, planar pressing surface and a second, topographically structured pressing surface, or by rolling between a first, purely cylindrical roller and a second roller that is topographically structured on its cylinder shell, wherein the topographical structuring of the second pressing surface, or of the second roller, corresponds to the material recesses (26).

8. A fuel cell (50) with an anode space (50a), a cathode space (50b) and an electrolyte (53), which separates the anode space (50a) from the cathode space (50b), wherein the anode space (50a) and the cathode space (50b) are respectively delimited on the side facing away from the electrolyte (53) by an end plate or bipolar plate (51, 52), and wherein an electrode (2) as claimed in claim 6 is arranged between at least one end plate or bipolar plate (51, 52), on one side, and the electrolyte (53), on the other side, such that the end plate or bipolar plate (51, 52) interacts with those regions (22a) of the electrode (2) in which the porosity is reduced in order to form a distributing structure (54, 55) for at least one operating medium of the fuel cell (50).

9. The fuel cell (50) as claimed in claim 8, wherein the end plate or bipolar plate (51, 52) additionally interacts with material recesses (26) of the electrode (2) in order to form the distributing structure (54, 55).

10. A method for producing an electrode (2) as claimed in claim 1, the method comprising
providing the electrode material (1) comprising the plate-like body (11) composed of the electrically conductive foam with the open and continuous porosity for the at least one operating medium of the fuel cell (50), wherein the plate-like body (11) has the upper side (12) and the underside (13) and wherein the thickness (14) of the material, measured between a point (12a, 12a') on the surface of the upper side (12) and the point (13a, 13a'), situated opposite said first-mentioned point (12a, 12a'), on the surface of the underside (13), varies across all of the points (12a, 12a') on the surface of the upper side (12) by at least 10%, and
at least temporarily compressing the electrode material (1) in terms of its thickness by at least 20% and at most 60%.

11. The method as claimed in claim 10, wherein the electrode material (1) is, for the compression, loaded with a pressure between 200 N/cm$^2$ and 3000 N/cm$^2$.

12. The electrode (2) as claimed in claim 1, wherein the other of the upper side (22) and the underside (23) is generally planar.

13. The electrode (2) as claimed in claim 1, wherein the material recesses (26) are each a single open cavity that reaches from the upper side (22) or the underside (23) to a maximum depth that is between 10% and 40% of the maximum material thickness of the electrode (2).

14. The electrode (2) as claimed in claim 1, wherein the each of the channel-like structures (24) transitions into a respective one of the material recesses (26).

15. The electrode (2) as claimed in claim 1, wherein the spaced-apart regions (22a), the channel-like structures (24), and the material recesses (26) all extend parallel to one another in a width direction of the plate-like body (21), wherein the spaced-apart regions (22a) are spaced-apart in a length direction of the plate like body (21), the length direction being perpendicular to the width direction, and wherein the spaced-apart regions (22*a*) and the channel-like structures (24) extend across an entire width of the plate-like body (21).

16. The electrode (2) as claimed in claim 15, wherein the material recesses (26) extend across the entire width of the plate-like body (21).

\* \* \* \* \*